United States Patent [19]

Bartling

[11] Patent Number: 5,788,746

[45] Date of Patent: Aug. 4, 1998

[54] METHOD FOR CLEANING A FILTER ELEMENT AND A FILTER MODULE FOR A FILTER INSTALLATION; A METHOD OF FILTERING CRUDE OR CONTAMINATED GAS AND A FILTER INSTALLATION

[75] Inventor: Werner Bartling, Elze, Germany

[73] Assignee: Kvaerner Bison GmbH, Springe, Germany

[21] Appl. No.: 753,146

[22] Filed: Nov. 20, 1996

[30] Foreign Application Priority Data

Nov. 20, 1995 [DE] Germany ............. 195 43 275.4

[51] Int. Cl.⁶ ................................................ B01D 46/46
[52] U.S. Cl. ......................... 95/268; 55/282; 55/283; 55/284; 55/302; 55/310; 55/311; 55/431; 95/278; 95/279
[58] Field of Search ................ 55/282, 283, 284, 55/302, 301, 310, 311, 320, 331, 337, 431; 95/268, 279, 278, 280

[56] References Cited

U.S. PATENT DOCUMENTS

| 3,609,944 | 10/1971 | Widbolz et al. | 55/337 |
| 4,477,339 | 10/1984 | Whaley et al. | 55/431 |
| 4,696,683 | 9/1987 | Vitovec et al. | 95/268 |
| 5,053,063 | 10/1991 | Sisk | 55/431 |
| 5,395,409 | 3/1995 | Klimczak et al. | 95/280 |

FOREIGN PATENT DOCUMENTS

| 001928842A | 12/1970 | Germany | 95/280 |
| 001214872 | 12/1970 | United Kingdom | 95/268 |

*Primary Examiner*—Jay H. Woo
*Assistant Examiner*—Minh-Chau T. Pham
*Attorney, Agent, or Firm*—Townsend and Townsend and Crew LLP

[57] ABSTRACT

The invention relates to a filter installation having at least one filter element for the filtering of a crude gas containing impurities, in particular particulate impurities. The crude gas flow to be filtered can be supplied to the filter installation via a crude gas line and at least two filter modules, each having at least one filter element, are provided. Each filter module is fluidly connected to the crude gas line via a module crude gas line through which a part of the crude gas flow can be supplied to the respective filter module. Each module crude gas line has a blocking member through which the supply of the respective partial crude gas flow can be interrupted for the cleaning of the filter element of the respective filter module.

33 Claims, 3 Drawing Sheets

METHOD FOR CLEANING A FILTER ELEMENT AND A FILTER MODULE FOR A FILTER INSTALLATION; A METHOD OF FILTERING CRUDE OR CONTAMINATED GAS AND A FILTER INSTALLATION

FIELD OF THE INVENTION

The invention relates to a method for the cleaning of at least one filter element of a filter installation, to a filter module for a filter installation, to a method of filtering a crude or contaminated gas, in particular a gas containing particulate impurities, in a filter installation, and also to a filter installation with at least one filter element.

DESCRIPTION OF PRIOR ART

The filter capacity of known filter installations is substantially determined by their constructional characteristics so that the dimensions of a filter installation become larger as the respectively required filter capacity becomes larger. This situation arises since it is necessary to use either a large number of filter elements or larger filter elements in order to make available a filter installation of correspondingly higher performance. In certain cases the dimensions of a filter installation can become so large that both its planning and manufacture as well as its transport and assembly on site become extremely complicated and costly.

Moreover, the system for the cleaning of the filter elements must be matched to the respective filter capacity, i.e. to the number and/or size of the filter elements, whereby the complication and costs are further increased.

SUMMARY OF THE INVENTION

An object of the invention is to provide a filter installation having a filter capacity which can be changed in a simple manner and also to provide methods which improve its operation.

Through the cleaning method of the invention for the filter elements of a filter installation, a compressed air flow, which releases contaminations from the filter elements, is combined in an advantageous manner with a suction flow which carries away the released impurities to the outside and which preferably also contributes to releasing impurities on the filter elements. In this manner an extremely effective and rapid cleaning of the filter installation is achieved.

This cleaning method can be used in accordance with the invention in a filter module having at least one filter element which has, for this purpose, for example, compressed air nozzles and a suction opening which can be coupled to a suction device. Instead of the compressed air nozzles, a part of the filtered clean gas flow can be led under pressure back into the filter module in order to release impurities from the filter elements in an advantageous manner without the supply of external compressed air and exclusively using process air at substantially constant temperature.

A filter installation formed in accordance with the invention comprises at least two filter modules and the supply of crude gas to be filtered can be interrupted module for module. In this manner the filter installation can be operated with the aid of the filtering method of the invention in accordance with which the individual filter modules are cleaned in modular manner one after the other.

The filter installation of the invention can thus be matched in a simple manner to the respectively required filter capacity by a suitable choice of the number of filter modules and can subsequently also be enlarged or made smaller.

Moreover, when using filter modules of substantially the same design, the power to be supplied for the cleaning which takes place module by module is constant and thus independent of the total filter capacity.

A particularly improved filter installation, which unites all the advantages provided by the invention, results when the filter installation is built up of filter modules which can be cleaned in accordance with the invention and is operated in accordance with the filtering method of the invention.

A filter installation of this kind is very effective because of the extremely effective cleaning in accordance with the invention and can, moreover, be matched because of its modular layout to practically any application and can also be planned, manufactured, transported and installed at cost.

BRIEF DESCRIPTION OF THE FIGURES

The invention will be described in the following by way of example and with reference to the drawings in which are shown.

DESCRIPTION OF PREFERRED EMBODIMENTS

Figure 1:
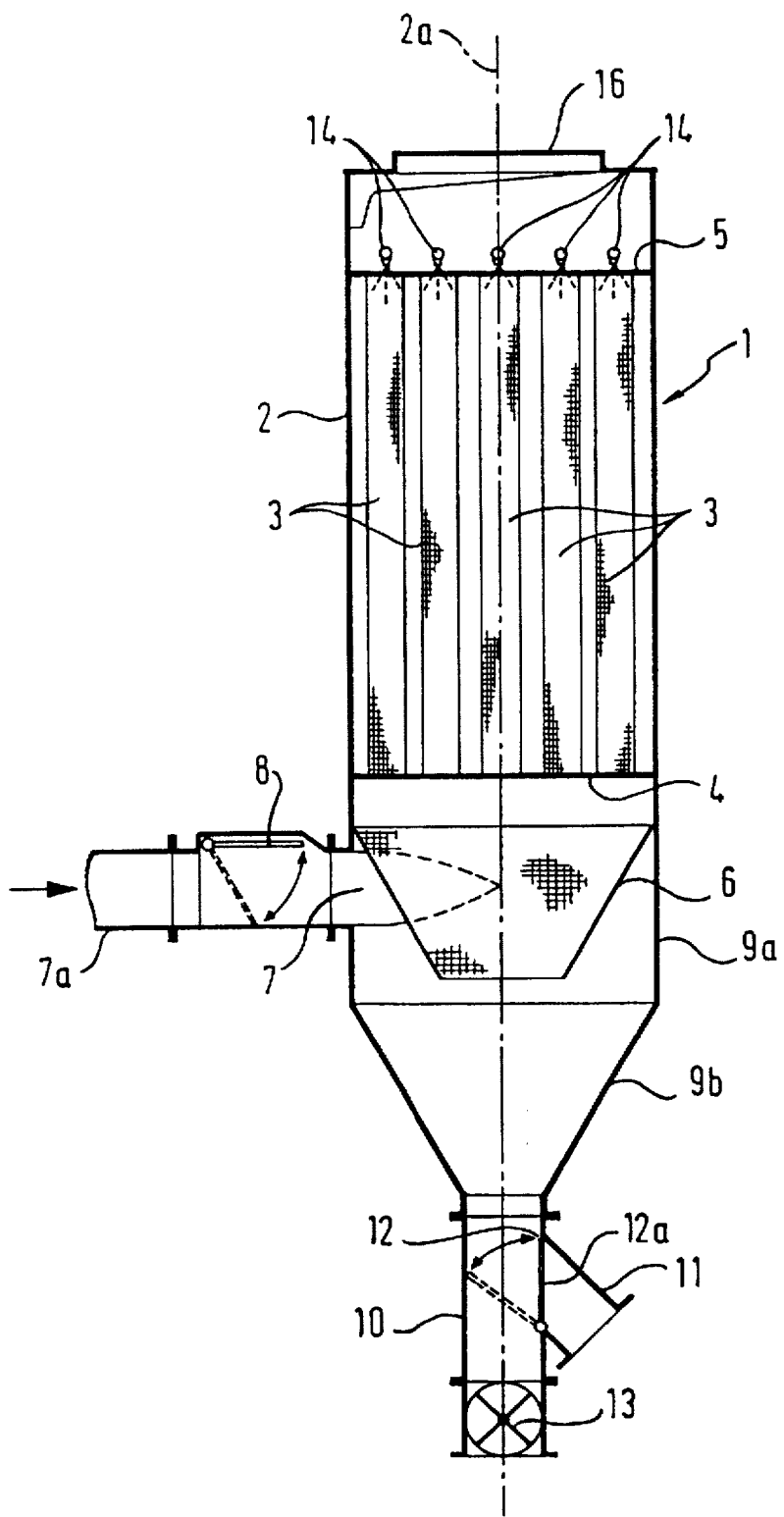
FIG. 1 is a sectional illustration of a side view of an embodiment of a filter module in accordance with the invention.

In accordance with FIG. 1 a filter module 1 formed in accordance with the invention has a cylindrical housing 2 with a substantially circular cross section. In the housing 2 there are provided two filter floors 4, 5 which are spaced apart in the direction of the longitudinal axis 2a of the housing, with several filter elements 3 extending between the filter floors approximately parallel to the longitudinal axis 2a of the housing. The spacings of the filter elements 3 relative to one another are selected depending on the particular conditions.

The filter elements 3 are formed as tubular hollow bodies, in particular as so-called filter hoses, filter pockets or filter candles, the peripheral wall of which consists at least substantially of a filter medium which is suitable for the particular impurities that are to be filtered out.

The filter elements 3 are preferably arranged in several, approximately concentric circles around a concentric opening formed in the lower filter floor 4 concentric to the longitudinal axis 2a of the housing. The securing of the filter elements 3 to the filter floors 4, 5 can be performed in any desired manner.

A cylinder section 9a forms the portion of the housing 2 beneath the lower filter floor 4 and is provided with an inlet 7 for the crude gas containing the impurities to be filtered out to enter. A supply stub 7a, provided with a preferably pneumatically or electrically actuatable blocking member or closure valve 8, is coupled onto the inlet 7. The blocking member 8 is illustrated in FIG. 1 in its position which frees the supply stub 7a as represented by a continuous line and in its blocking position as represented by a chain-dotted line.

At its lower end the cylinder section 9a with a tapering funnel section 9b which is joined to an end stub 10 at the bottom. An extraction lock 13, which is preferably formed as a cellular wheel lock, is provided at the lower free end of the end stub 10. Impurities removed from the crude gas can be transported off outwardly via the extraction lock 13.

Moreover, a suction opening 12 is formed at the side of the end stub 10 to which a suction stub 11 is coupled. The size of the suction opening 12 can be varied by means of a regulating member 12a, which is likewise preferably electrically or pneumatically operable. The regulating member is preferably mounted either at the suction stub 11 or at the end stub 10 and can be swung from a position illustrated in FIG. 1 by a continuous line, which fully closes the suction opening 12, to a position into the end stub 10 in order to fluidly connect the suction stub 11 to the housing 2, and to separate the removal lock 13 from the latter. This position of the regulating member 12a is shown in FIG. 1 by a chain-dotted line.

A cyclone-like pre-separator 6 is arranged beneath the lower filter floor in the cylinder section 9a of the housing 2 as a pre-cleaning device, and the crude gas first enters into the pre-separator via the inlet 7. The supply stub 7a is so arranged that the crude gas essentially enters tangentially into the cyclone pre-separator 6.

In the region of the upper filter floor 5 there are provided compressed air nozzles 14 which can be coupled to a compressed air source which is not shown in FIG. 1, and which can basically be arranged in any desired manner. What is important is that the compressed air nozzles 14 are so directed that the compressed air flows they generate can ideally release the impurities filtered out by the filter medium from the filter elements 3.

For this purpose at least a part of the compressed air nozzles 14 is preferably so arranged that compressed air flows can be generated into the filter elements 3 in order to achieve a particularly effective blowing out of the impurities from the filter medium by this flow, which is opposed to the normal movement of the contaminated crude gas through the filter element.

In the area above the upper filter floor 5 the filter module 1 is formed to lead off filtered clean gas, either into the free atmosphere or into a clean gas line. Moreover, at least one flap 16 is provided at the upper end of the filter module 1 and is formed as a service flap which enables access to the filter module 1 and/or as a pressure relief flap guaranteeing protection against explosion.

In filter operation, crude gas containing impurities to be filtered out passes, when the blocking member 8 is not actuated, via the supply stub 7a initially into the pre-separator 6, in which a larger part of the impurities, in particular particulate and/or dust-like impurities, are pre-separated. This material falls downwardly out of the pre-separator 6 through the end stub 10 to the extraction lock 13, since the regulating member 12a closes off the suction opening 12 during the filter operation.

The crude gas freed of its pre-separable impurities passes out of the pre-separator 6, via the central opening provided in the lower filter floor 4, into the filter element region of the housing 2 and flows through the filter medium of the filter element 3 from the outside to the inside so that the filter medium at least substantially filters out the impurities still contained in the crude gas and the filtered clean gas in the interior of the filter elements 3 flows in the direction of the upper filter floor 5 and is transported off above the latter towards the outside.

For the cleaning of the filter elements 3 the supply stub 7a is closed with the aid of the blocking member 8 and thus the supply of crude gas to the filter module 1 is interrupted.

Moreover, the suction opening 12 is freed by actuation of the regulating member 12a.

A compressed air flow extending inside and/or outside of the tubular filter elements 3 and directed towards its peripheral wall formed essentially by the filter medium is generated by means of the compressed air nozzles 14, whereby impurities filtered out from the filter medium are released from the filter elements 3. This material falls downwardly in the housing 2 and is sucked off via the suction opening 12 by means of the suction device coupled to the suction stub 11.

An advantage of this cleaning method lies in the fact that the compressed air flow and the suction flow are directed in substantially the same direction, whereby the transporting off of the impurities released from the filter elements 3 is considerably accelerated. A further advantage lies in the fact that, through interruption of the crude gas flow entering into the filter module 1 by means of the blocking member 8 in the housing 2, no counterflow in the direction of the upper filter floor 5 opposing the transporting off of the released impurities is present. The cleaning of the filter module 1 in accordance with the invention thus takes place under highly favorable conditions and can thus be carried out in a particularly effective manner and in the shortest time.

After cleaning has taken place, the suction opening 12 is closed again and the supply stub 7a is freed again.

The time sequence of the cleaning and also the intensity of the compressed air flow and of the suction air flow are regulated by a control unit not shown in FIG. 1. Both the actuation of the blocking member 8 and of the regulating member 12a as well as the activation of the compressed air source and of the suction device preferably take place substantially simultaneously. The compressed air flow can be generated during the cleaning time with constant or alternating intensity and can, for example, consist of individual compressed air blasts at intervals which can be varied as desired.

Figure 2:
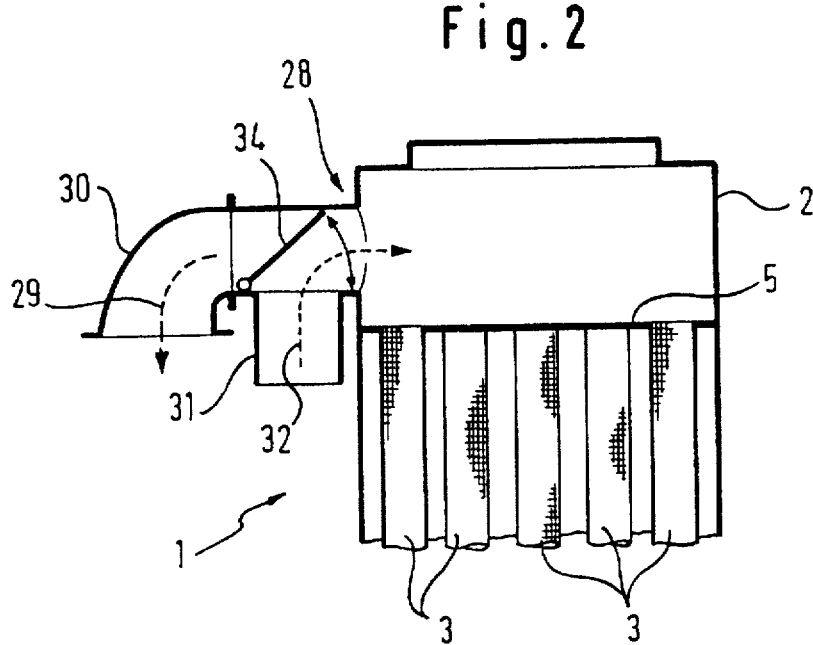
FIG. 2 is a sectional illustration of a side view of the upper region of another embodiment of a filter module in accordance with the invention.

FIG. 2 shows the upper region of an alternative embodiment of a filter module 1 in accordance with the invention. The filtered clean gas flow 29 is led off from the housing 2 via an outlet 28 and a clean gas line 30. A compressed air line 31 opens into the clean gas line 30 in the region of the outlet 28. A regulating member 34 actuatable via a non-illustrated control unit and preferably formed as a pivotable blocking flap produces in its cleaning position shown in FIG. 2 a flow connection between the compressed air line 31 and the housing region above the filter elements 3 while simultaneously interrupting the access to the clean gas line 30.

In the embodiment of a filter module 1 in accordance with the invention as shown in FIG. 2, a compressed air flow 32 is led into the housing 2, with the regulating member 34 located in the cleaning position in order to separate the impurities from the filter elements 3. The arrangement of compressed air nozzles as shown in the filter module 1 of FIG. 1 is omitted. This results in the compressed air flow 32 also having those technical flow advantages which were named above with respect to the embodiment of FIG. 1 for the compressed air nozzles.

After cleaning has taken place the compressed air line 31 is closed by means of the regulating member 34 and the flow connection between the housing 2 and the clean gas line 30 is reestablished to lead off the filtered clean gas flow 29.

Figure 3:
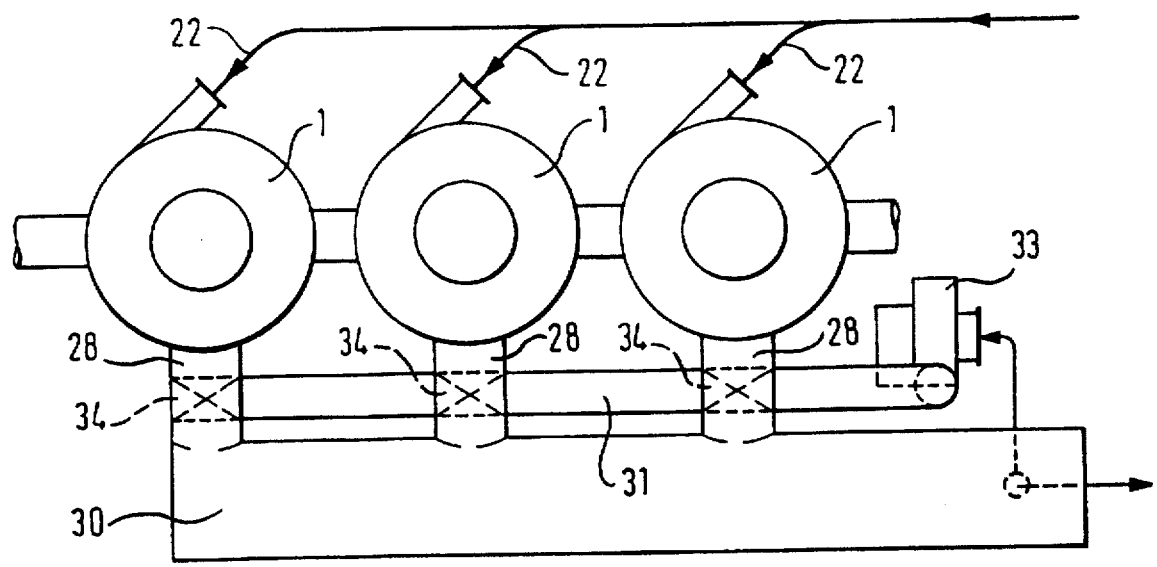
FIG. 3 is a schematic illustration of an arrangement of three filter modules of FIG. 2 in accordance with the invention, with an arrangement for the partial return and guidance of a clean gas flow as compressed air.

In accordance with FIG. 3 three filter modules 1 in accordance with the invention and formed in accordance with the embodiment of FIG. 2 are connected to a common clean gas line 30 for leading off the respectively filtered clean gas flows. The filter modules can be cleaned in accordance with the embodiment of FIG. 2 by means of a compressed air flow. A fan 33 is provided in order to generate the compressed air flow 32 for the cleaning of the filter modules 1. The fan 33 sucks at least a part of the total cleaned gas flow out of the clean gas line 30 and supplies it through a compressed air line 31 to the respective filter module 1 to be cleaned.

The cleaning of the filter modules 1 preferably takes place one after the other, so that at any point in time the regulating member 34 of only one of the filter modules 1 is located in the cleaning position, thereby fluidly connecting the respective outlet 28 to the compressed air line 31. During this, the remaining filter modules 1 are in normal filter operation, in which crude gas to be filtered is supplied to them via a respective module crude gas line 22 and in which they feed their respective filtered clean gas flows into the clean gas line 30, so that a clean gas flow is present from which at least a portion sufficient for the cleaning of the one filter module 1 can be extracted by the fan 33.

The advantage of this type of cleaning lies in the fact that no external compressed air source is required and exclusively process air generated by the filter installation itself is used which has a substantially constant temperature. In this manner conditions are ensured which remain substantially constant and are favorable for the cleaning of the filter elements.

Figure 4:
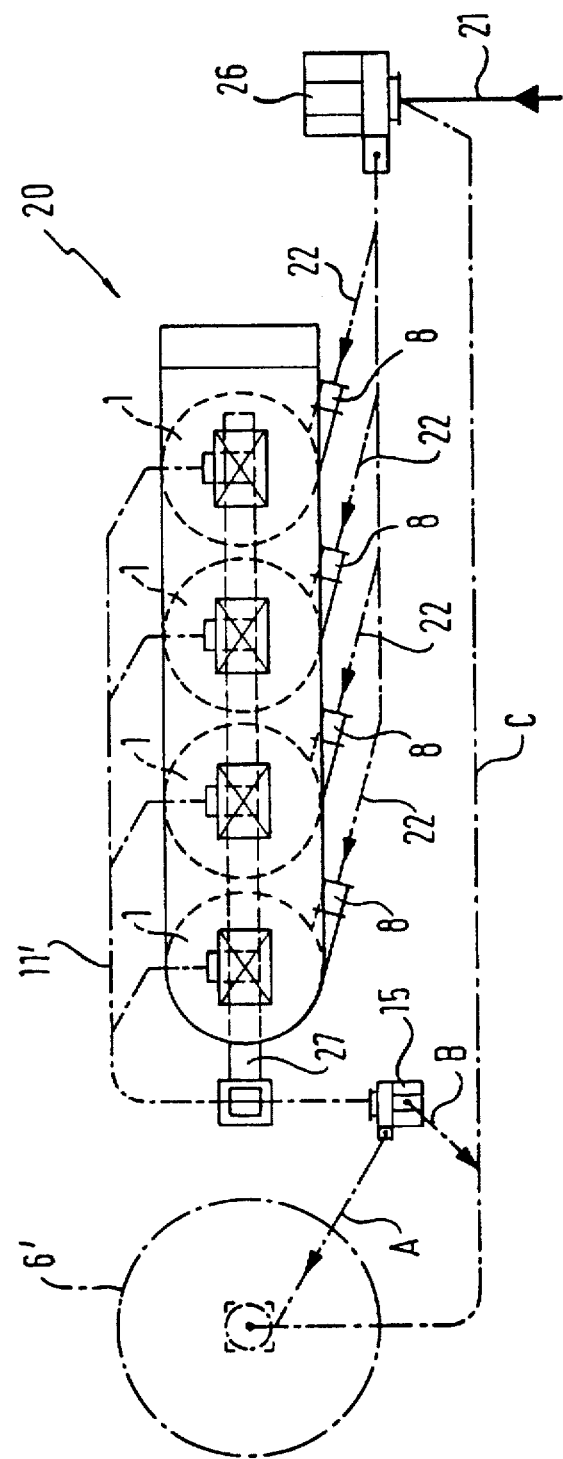
FIG. 4 is a schematic illustration of the layout of a filter installation in accordance with the invention and containing four filter modules.

FIG. 4 shows the principal layout of a filter installation 20 in accordance with the invention having four filter modules 1 which can be of the type described in FIG. 1 and/or can be cleaned in the manner of the modules described with respect to FIGS. 2 and 3.

The tangential arrangement of the supply stub provided with the blocking member 8, which is required for the cyclone preseparator, can be best seen in FIG. 4.

Crude gas to be filtered is supplied via a respective module crude gas line 22 to each filter module 1 and is fed in from a central crude gas line 21. A fan 26 is arranged in the flow path in the flow direction upstream of the first module crude gas line 22 and drives the crude gas to be filtered into the individual filter modules 1.

The suction opening of each filter module 1 is coupled via its suction stub to a central suction line 11', onto which the suction device 15 is connected. The impurities sucked off from the filter modules 1 flow from the suction device 15 either directly via a line B, or initially via a line A and a pre-separator 6' into a line C, which opens into the crude gas line 21 before the fan 26. In this manner a particularly effective multiple filtration is achieved.

The filter installation 20 of the invention is furthermore provided with a central collection device 27 to which each filter module 1 is coupled via its extraction lock and from which impurities collected in the filter modules 1 can be transported off.

The filter elements of the filter installation 20 of the invention are cleaned modularly in such a way that at any point in time it is always only the cleaning of a single filter module which takes place. For this purpose a blocking member 8 associated with the filter module 1 which is respectively to be cleaned is actuated by a control unit, which is not shown in FIG. 4, in order to close the corresponding module crude gas line 22. Thereafter, the cleaning of this filter module 1 takes place by means of compressed air and suction air as described above with reference to FIGS. 1 to 3.

After a predetermined time duration, which is, for example, determined by the kind of impurities to be filtered out, by the nature and/or the degree of impurity of the filter elements, the supply of compressed air is interrupted, the suction opening is closed and the module crude gas line 22 is freed, so that the cleaned filter module 1 of the filter installation is available again for filtration.

The cleaning of the next filter module 1 preferably takes place directly after filter operation has been recommenced, in that the respective blocking and regulating members are correspondingly actuated by the control unit, so that the suction device 15 can operate continuously. In the same way the pressure source not shown in FIG. 4 can operate uninterruptedly and can be fluidly connected in series to the compressed air nozzles of the individual filter modules 1.

An advantage of the filter installation 20 of the invention thus lies in the fact that, independent of the number of filter modules 1, and thus independent of the total filter capacity of the filter installation 20, the same performance made available by the suction device 15 and by the compressed air source is sufficient for the cleaning operation. Even with a large total filter capacity of the filter installation 20, only a comparatively small cleaning capacity is required as a result of its sub-division into a plurality of smaller units. Moreover, through the modular assembly of the filter installation 20 both its manufacture and also its transport and erection on site are considerably simplified, so that a considerable cost reduction can be achieved with a filter installation 20 formed in accordance with the invention.

Any desired filter modules 1 can basically be used for the filter installation 20 of the invention. Thus the cleaning of the filter modules 1 can, for example, take place only by means of either compressed air or suction air. It is also possible to dispense with a pre-separator particular to each module and to simply use a central pre-separator 6' as shown in FIG. 4 for the pre-cleaning of the crude gas flow which is distributed to the individual module clean gas lines 22.

The preferred embodiment of the filter installation 20 of the invention comprises, however, at least two filter modules 1 in accordance with FIGS. 1 and 2, the cleaning of which respectively takes place by means of the combined cleaning system of the invention comprising a compressed air flow and a suction air flow.

The total number of the filter modules 1 which have to be combined into a filter installation 20 depends on the time required for cleaning of each filter module and also for the time duration between two cleaning processes for the same filter module 1, with these times depending on the respective conditions of use such as the kind of impurity, the nature of the filter medium, etc.

For example the cleaning time amounts to ten seconds, with each filter module 1 having to be cleaned every four minutes. Thus, a filter installation comprising 4 min/10 s=24 filter modules can be cleaned by a single cleaning system of constant cleaning capacity, and consisting of a suction device 15 and a compressed air source.

What is claimed is:

1. A method of cleaning at least one filter element of a plurality of filter elements in a filter installation in which a crude gas containing impurities is filtered, the method comprising the steps of:

supplying the crude gas to the filter installation;

generating a flow of the crude gas through the plurality of filter elements to trap the impurities in the flow of the crude gas;

interrupting the flow of the crude gas to the at least one filter element containing the trapped impurities to be cleaned;

directing a compressed air flow in a compressed air flow direction to the at least one filter element to release at least a portion of the trapped impurities from the at least one filter element; and producing a suction air flow substantially in the compressed air flow direction to carry the released impurities out of the at least one filter element, wherein the step of directing a compressed air flow and the step of producing a suction air flow occur at least substantially simultaneously.

2. The method of claim 1, wherein the step of producing a suction air flow comprises releasing a portion of the trapped impurities from the at least one filter element with the suction air flow.

3. The method of claim 1, wherein the suction air flow is substantially weaker than the compressed air flow.

4. The method of claim 1, further comprising the step of adjusting the strength and duration of the compressed air flow and the strength of the suction air flow based on the nature, type, and degree of the impurities of the crude gas.

5. The method of claim 1, further comprising the step of diverting at least a portion of the filtered crude gas flow back into the filter elements under pressure in the compressed air flow direction.

6. The method of claim 1, further comprising the step of controlling the time sequence of the step of directing the compressed air flow and the step of producing a suction flow.

7. Filter module for a filter installation for the filtering of a crude gas containing impurities and flowing through the installation, the filter module comprising a housing in which at least one filter element is arranged for trapping the impurities in the crude gas, and at least one compressed air device for applying a compressed air flow to the at least one filter element in a compressed air flow direction to release the impurities trapped by the at least one filter element, the housing having an inlet for the crude gas flow to be filtered and an outlet for a filtered crude gas flow, the housing including a suction opening for coupling to a suction device to produce a suction air flow, which is at least substantially simultaneous to the compressed air flow and substantially in the compressed air flow direction, to carry the released impurities out of the housing.

8. The filter module in accordance with claim 7, wherein the at least one compressed air device is for coupling to a compressed air source.

9. The filter module in accordance with claim 7, wherein the at least one compressed air device includes a compressed air line which is coupled to the housing above the at least one filter element for communicating to a compressed air source, the at least one compressed air device further comprising a regulating member for releasing and interrupting the coupling between the compressed air line and the housing.

10. The filter module in accordance with claim 9, wherein the compressed air source comprises a fan for diverting at least a portion of the filtered crude gas flow back into the housing under pressure via the compressed air line.

11. The filter module in accordance with claim 7, wherein the housing further comprises a blocking member disposed near the inlet of the crude gas for releasing the crude gas flow into the housing for filtering and for interrupting the crude gas flow for cleaning the at least one filter element.

12. The filter module in accordance with claim 11, wherein the housing further comprises an inlet stub coupled to the inlet of the crude gas and the blocking member.

13. The filter module in accordance with claim 12, wherein the housing comprises an elongate hollow cylinder of circular cross section with a longitudinal axis, an upper intermediate floor extending substantially perpendicular to the longitudinal axis and disposed near an upper end of the housing, and a lower intermediate floor extending substantially perpendicular to the longitudinal axis and disposed near a lower end of the housing spaced from the upper intermediate floor, wherein the at least one filter element extends generally parallel to the longitudinal axis between the upper and lower intermediate floors, wherein the crude gas inlet and the suction opening are arranged adjacent the lower intermediate floor, wherein the at least one compressed air device comprises a compressed air nozzle coupled to the housing adjacent the upper intermediate floor, and wherein the outlet for the filtered crude gas flow is disposed adjacent the upper intermediate floor.

14. The filter module in accordance with claim 13, wherein the at least one filter element has a hollow tubular body with a peripheral wall that comprises a filter medium for filtering out impurities in the crude gas, the peripheral wall defining an interior, wherein the housing comprises a side wall and the outlet for the filtered crude gas flow is disposed through the side wall between the upper and lower intermediate floors, the crude gas flow passing through the at least one filter element from outside the peripheral wall to inside the peripheral wall and emerging as the filtered crude gas flow through the interior of the at least one filter element toward the upper intermediate floor and out through the outlet of the housing.

15. The filter module in accordance with claim 13, wherein the housing further comprises at least one flap for servicing or pressure relief adjacent the upper end of the housing above the upper intermediate floor.

16. The filter module in accordance with claim 7, wherein the filter module comprises a plurality of the filter elements arranged in a plurality of substantially concentric rings in the housing, wherein the at least one compressed air device comprises at least one compressed nozzle coupled to each filter element adjacent an upper open end of the respective filter element and wherein the compressed air flow generated by the at least one compressed air device is generally opposite to the direction of the crude gas flow and filtered crude gas flow through the respective filter elements.

17. The filter module in accordance with claim 7, wherein the housing further comprises a suction stub coupled to the suction opening, the suction stub comprising a regulating member disposed adjacent the suction opening to change the size of the suction opening to adjust the strength of the suction air flow, the suction device being connectable to the suction stub.

18. The filter module in accordance with claim 7, further comprising an external preliminary separator for pre-cleaning a main gas, the external preliminary separator having a main inlet for the main gas flow to be pre-cleaned, an outlet for a pre-cleaned crude gas flow being coupled to the crude gas inlet of the housing, and an additional inlet coupled to the suction opening for receiving an additional gas flow containing impurities filtered by the at least one filter element out of the crude gas flow entering the housing.

19. The filter module in accordance with claim 18, wherein the housing further comprises a pre-separator disposed beneath the lower intermediate floor and coupled between the at least one filter element and the crude gas inlet for separating impurities from the crude gas prior to entering the at least one filter element.

20. The filter module in accordance with claim 19, wherein the housing comprises a cylinder section with a cross section approximately the same as the portion of the housing between the upper and lower intermediate floors and a downwardly tapering funnel section adjoining the cylinder section, the crude gas inlet being disposed in the cylinder section in an upper region of the pre-separator and being so formed that the crude gas flow to be filtered enters generally tangentially into the pre-separator.

21. The filter module in accordance with claim 20, wherein the pre-separator is a cyclone pre-separator.

22. The filter module in accordance with claim 20, wherein the funnel section extends into an end stub of substantially constant cross section and having a side wall in which the suction opening is disposed, the end stub including an extraction lock through which the impurities removed from the crude gas flow are transported out of the housing.

23. A method of filtering a crude gas flow containing impurities in a filter installation subdivided into at least two filter modules, each having at least one filter element, the method comprising the steps of:

introducing a portion of a crude gas flow into each of the at least two filter modules of the filter installation to trap the impurities in the portion of the crude gas flow; and cleaning the filter modules in a modular manner by interrupting one by one the portion of the crude gas flow into each of the filter modules and cleaning the at least one filter element in the interrupted filter module by the steps of directing a compressed air flow in a compressed air flow direction to the at least one filter element of the interrupted filter module to release the trapped impurities, and producing a suction air flow, substantially in the compressed air flow direction and at least substantially simultaneously to the step of directing the compressed air flow, to carry the released impurities out of the interrupted filter module, and thereafter reintroducing the portion of the crude gas flow into the interrupted filter module after the at least one filter element in the interrupted filter module is cleaned.

24. The method of claim 23, further comprising the step of pre-cleaning the crude gas flow prior to the step of introducing the crude gas flow into the filter modules, wherein the step of pre-cleaning is carried out by a single main pre-separator associated with the filter installation or by a plurality of modular separators, each associated with a respective one of the at least two filter modules.

25. The method in accordance with claim 24, wherein the step of pre-cleaning the crude gas flow is performed with a cyclone pre-separator.

26. The method in accordance with claim 23, further comprising the step of collecting the filtered impurities in the filter modules using an extraction lock provided at each filter module to a central collection device and the step of transporting the collected impurities from the central collection device.

27. The method in accordance with claim 23, further comprising the step of diverting at least a portion of the filtered crude gas flow back into the filter elements under pressure in the compressed air flow direction.

28. Filter installation having at least one filter element for the filtering of a crude gas flow containing impurities entering through a crude gas line coupled to the filter installation, the filter installation comprising at least two filter modules, each having at least one filter element and having a module crude gas line fluidly coupled to the crude gas line for receiving a portion of the crude gas flow and trapping a portion of the impurities, each module crude gas line having a blocking member for interrupting the respective portion of the crude gas flow into the respective filter module which is to be cleaned, each filter module having a compressed air inlet and a suction opening, the compressed air inlet for receiving a compressed air flow in a compressed air flow direction to release the respective portion of the trapped impurities and the suction opening for receiving a suction air flow which is at least substantially simultaneous to the compressed air flow and substantially in the compressed air flow direction to carry the released impurities out of the interrupted filter module which is to be cleaned.

29. The filter installation in accordance with claim 28, further comprising a central collecting device, wherein each filter module has an extraction lock coupled to the central collecting device for collecting the released impurities in the respective filter modules.

30. The filter installation in accordance with claim 28, further comprising a clean gas line, wherein each filter module has a module clean gas line fluidly coupled to the clean gas line for the leading away of a filtered partial clean gas flow from each filter module to supply the respective filtered clean gas flow to the clean gas line.

31. The filter installation in accordance with claim 28, further comprising a fan coupled to the crude gas line upstream of the filter module crude gas lines for driving the crude gas into the individual filter modules.

32. The filter installation in accordance with claim 28, further comprising a fan for diverting at least a portion of the filtered crude gas flow under pressure back into each filter module through the respective compressed air inlet.

33. Filter module for a filter installation for the filtering of a crude gas containing impurities and flowing through the installation, the filter module comprising a housing in which at least one filter element is arranged for trapping the impurities in the crude gas, at least one compressed air device for applying a compressed air flow to the at least one filter element in a compressed air flow direction to release the impurities trapped by the at least one filter element, the housing having an inlet for the crude gas flow to be filtered and an outlet for a filtered crude gas flow, and a suction device coupled to a suction opening of the housing for producing a suction air flow at least substantially simultaneously to the compressed air flow and flowing in substantially the same direction as the compressed air flow direction for carrying the released impurities out of the housing.

* * * * *